United States Patent Office 3,728,274
Patented Apr. 17, 1973

3,728,274
PROCESS FOR PREPARING SPHERES OF URANIUM OXIDE AND URANIUM OXIDE-PLUTONIUM OXIDE, HAVING A CONTROLLED POROSITY
Panayotis Gerontopoulos, Livorno, Dino Neri, Pisa, and Ruggero Renzoni, Milan, Italy, assignors to Snam Progetti S.p.A., Milan, Italy
Filed Dec. 5, 1969, Ser. No. 882,508
Claims priority, application Italy, Jan. 8, 1969, 11,249/69
Int. Cl. C09k 3/00
U.S. Cl. 252—301.1 R      16 Claims

ABSTRACT OF THE DISCLOSURE

This invention relates to a process for the production of a porous refractory material which comprises uranium oxide and an oxide selected from the group consisting of the oxides of thorium, plutonium, beryllium, silicon, aluminum and magnesium, which process comprises heating the refractory material in an inert or oxidizing atmosphere, replacing the inert or oxidizing atmosphere by a reducing atmosphere, further increasing the temperature of the heated refractory material to produce a material having a porosity of from 2% to 30%.

---

Figure 1:
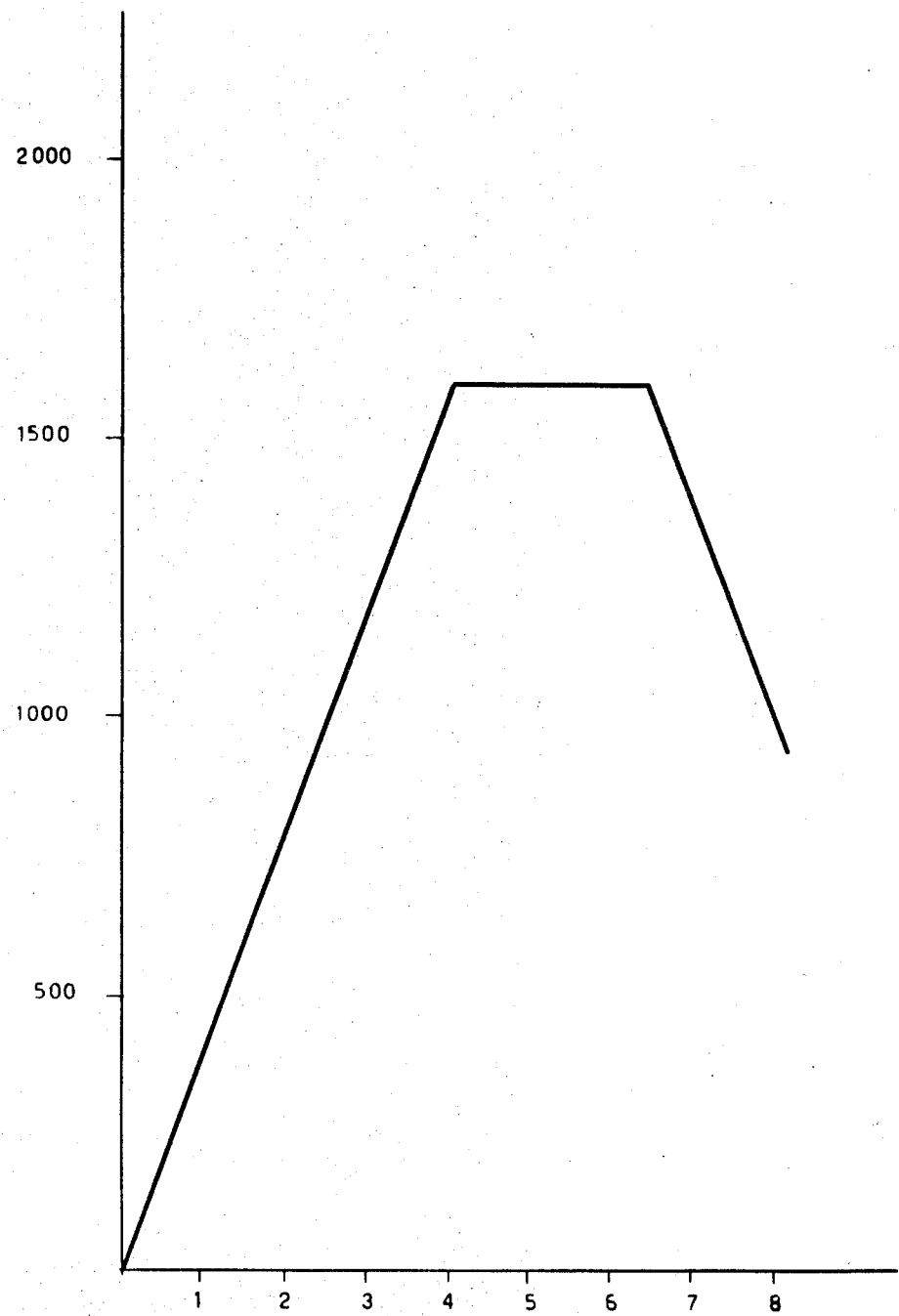

This invention relates to the preparation of refractory material. Examples of such material are microspheres of uranium oxide or of mixed oxides of uranium and other metals used in the nuclear field, having a controlled degree of porosity in the range of, for example, from 2%–30%.

Our British Patent No. 1,067,095 relates to a process for preparing microspheres of refractory materials which are difficult to agglomerate, in particular the oxides of uranium, thorium, plutonium, beryllium, aluminum, magnesium and silicon, separately or in mixtures.

This process consists in admixing a cellulosic resin, optionally in the presence of an alcohol, with an aqueous solution of compounds containing the elements with which the microspheres are to be constituted; dripping the resulting solution into an alkaline solution, thereby forming regular spheres having controlled size; drying the spheres; and subjecting the calcined spheres to a high temperature treatment, generally from 1300°–1600° C. in a suitably controlled atmosphere. Generally the product of this process has a density of from 96–99% of that of theoretical density of the corresponding oxide.

Now, the preparation of microspheres of ceramic nuclear materials having a relatively higher degree of porosity, is of interest in certain applications, for example as a fuel in certain types of fuel elements used in high temperature, gas-cooled nuclear reactors. The addition of inert substances is also described in United States patent specification No. 3,320,179, with particular reference to a sol-gel process. However, these extraneous volatile additives can complicate the reaction mechanism, affect the production costs and adversely affect the purity of the final product.

According to the present invention, there is provided a process for the production of a porous refractory material selected from refractory metal oxides, which process comprises heating a refractory metal oxide in an inert or oxidizing atmosphere, replacing the inert or oxidizing atmosphere by a reducing atmosphere, further increasing the temperature of the heated refractory metal oxide and then cooling the refractory metal oxide so as to produce a refractory material having the desired porosity.

According to a preferred aspect of the present invention, there is provided a process for the production of a porous refractory material selected from the oxides of uranium, thorium, plutonium, beryllium, silicon, aluminum and magnesium, alone or in admixture, which process comprises heating the selected refractory material in finely divided form at a rate of from 320 to 480 centigrade degrees per hour to a maximum temperature in the range of from 1280 to 1920° C., maintaining the heated material in that range for from 2 to 3 hours, and then cooling the refractory material at a rate of from 320 to 480 centigrade degrees per hour to a temperature in the range of from 960 to 1440, and thence to room temperature at any desired rate, the atmosphere in which the refractory material is situated being inert or oxidizing over the initial part of the heating stage but being made reducing at a temperature between 700° C. and the maximum temperature and maintained reducing for the remainder of the process, so as to produce refractory material having the desired porosity.

The maximum temperature of the cycle is, as stated above, in the range from 1280 to 1920° C., but it is advantageous for it to lie in the range 1440–1760° C., preferably approximately 1600° C.

The heating rate to the maximum temperature and the cooling rate therefrom is preferably in the range 360 to 440 centigrade degrees per hour, most preferably 400 centigrade degrees per hour.

The refractory material is maintained at the maximum temperature for from 2 to 3 hours, preferably from 2.25 to 2.75 hours, desirably approximately 2.5 hours.

The temperature to which a controlled temperature descent is effected is preferably in the range from 1080 to 1320° C., more preferably approximately 1200° C.

Although the process may be applied satisfactorily with any of the specified oxides, the preferred and more preferred conditions specified above are in general most applicable to uranium oxide to a mixture of uranium and plutonium oxides.

The reducing atmosphere introduced during the process may be, for example, hydrogen or a mixture of hydrogen and an inert gas, e.g. argon.

The process may be applied to the specified refractory materials in any suitable form, although usually they will be in the form of spheres, generally microspheres having a diameter in the range of from, for example, 100 to 1500 microns.

Figure 2:
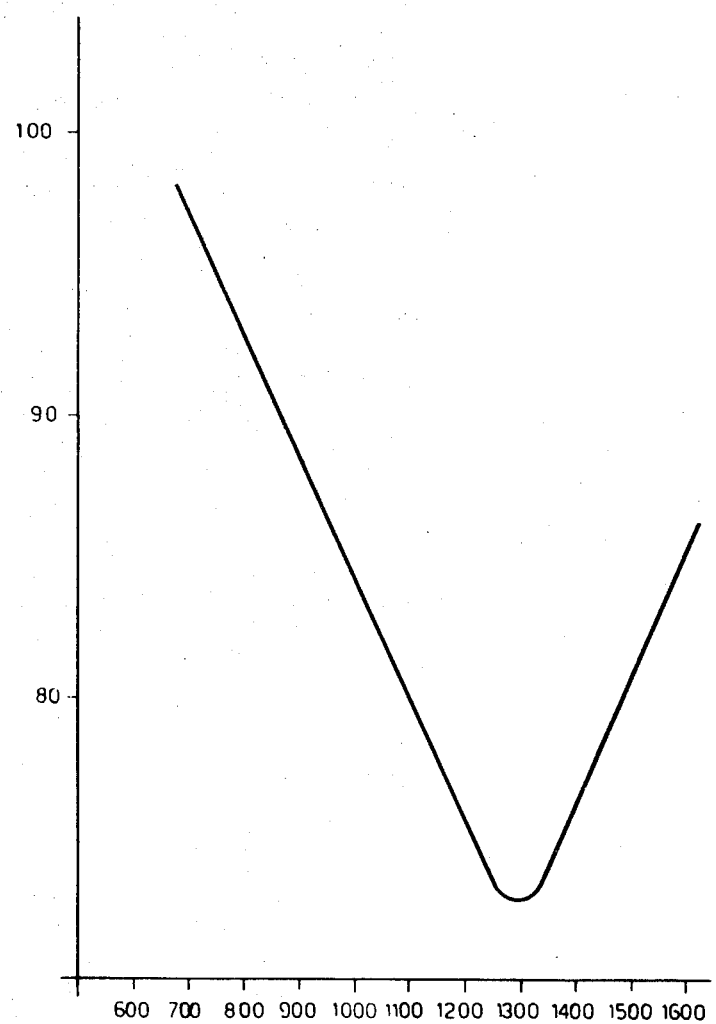

For a better understanding of the present invention and to show how the same may be carried into effect, reference will now be made, by way of example, to the accompanying drawings in which:

FIG. 1 shows graphically the variation of temperature with time during a process according to the present invention; and FIG. 2 show graphically the dependence of the density of the product of the process on the temperature at which the atmosphere is changed from an inert or oxidizing atmosphere to a reducing atmosphere.

Referring now to FIG. 1, the temperature (in ° C.) inside the reaction furnace is shown on the ordinate and the time expressed in hours is shown on the abscissa. The thermal cycle is, in effect, dividable into the following three main stages:

(a) temperature increase up to 1600° C. with a velocity of 400° C./hour;
(b) staying time at 1600° C.: 2.5 hours; and
(c) controlled descent down to 1000–1200° C. with a velocity of 400° C./hour and afterwards (not shown) freely down to room temperature.

Generally, up to a temperature of 650° C., the operation is effected in an oxidizing temperature, for example air or oxygen, or in an inert atmosphere, for example argon or nitrogen.

Incidentally, it is interesting to note that, when using uranium oxide, thermogravimetric determinations indicate that at about 600° C. under our experimental conditions, there occurs the completion of the transformation of the starting uranium oxide $U_3O_8$.

As mentioned above, at a temperature of at least 700° C. during the heating stage, the atmosphere is changed abruptly into a reducing atmosphere, for example, hydrogen or argon-hydrogen 4%. We have found that the final total porosity of the particles of the oxide treated in the process of the invention depends, inter alia, on the temperature at which the atmosphere was changed from an oxidizing to a reducing atmosphere.

The porosity of the product of the process may be measured by calculating the density of the refractory bodies by means of a mercury density bottle and by relating the measured value to the theoretical density of the oxide.

In FIG. 2 there is plotted the dependence of the density of the product on the temperature at which the atmosphere is changed in the case of microspheres of uranium oxide having a final diameter at approximately 800 microns. The temperature of atmosphere change is plotted along the abscissa and the measured densities, expressed as percentages of the theoretical density of $UO_2$ (10.97 g./cm.$^3$), are plotted along the ordinate. In all other respects the conditions were as described with reference to FIG. 1. The variation of the density of the $UO_2$ microspheres with the temperature of atmosphere change appears to be connected with the reduction transformation of $U_3O_8$ to $UO_2$. The latter compound has a structure which is more compact than the former and allows different shrinkage possibilities from the original dimensions of the $U_3O_8$ microspheres at the different reduction temperatures.

In any case, it is important to note, in this connection, that this dependence is a complex function of different parameters, e.g. the preparation of the original microspheres of $UO_{3.2-3.3}$, the thermal cycle, the diameter of the microspheres, and the geometry of the charge in the high temperature furnace.

The existence of a minimum in the plot shown in FIG. 2 is probably related to the instability of the $U_3O_8$ oxide at temperatures higher than 1300° C. but this is only an hypothesis.

It has been found that the method allows a good reproducibility of the final density of the product for different or identical charges. A good control over experimental conditions enables a reproducibility of the order of 99% to be attained. Metallographic examinations have shown that the porosity is distributed homogeneously over the whole mass of the microspheres.

Compression tests for measuring the tensile strength on microspheres having a porosity equivalent to a relative density of 90 and 80% have been carried out. These tests were carried out with a 500 kg. Amsler machine (model 2044), making use of a full scale of 50 kg. and of two sheets of hardened and rectified steel. The average tensile strength for microspheres having a porosity equal to 20% was 2.2 kg. and for those having a porosity equal to 10% was 3.8 kg.

The thermal treatment described with reference to FIG. 1 specifies a staying time at 1600° C. to 2.5 hours. Prolonged times lead to substantial variations of density, and hence of porosity, of the product. For example, with microspheres having a density of 70% relative to the theoretical one, a staying time of 8 hours at a temperature of 1600° C. leads to an increase to density equal to 3%.

When the process is concerned with uranium oxide spheres, the atomic ratio U/O of the microspheres of the final product has been found to be always in the range 2.00–2.01.

The thermal treatment was carried out in furnaces of the Tamman type having a graphite resistance, equipped with internal reaction pipes of alumina, with an internal diameter of mm. 45, and employed charges of microspheres of the order of 100 g. However, for production purposes on an industrial scale, use may be made of special furnaces which allow the realization of a substantially homogeneous treatment of all the microspheres of a given charge which may be in the order of several kilograms, e.g. fluidized bed furnaces.

The present invention will now be illustrated by the following examples.

EXAMPLE 1

This example is concerned with the preparation of microspheres of $UO_2$ having a porosity of approximately 20%. An aqueous solution was prepared by mixing solutions of uranyl nitrate and of methyl-propyl-cellulose, the concentrations of these compounds being such that in the resulting solution, the uranyl nitrate had a concentration equivalent to 150 g. of $UO_2$ per litre and the methyl propyl cellulose a concentration of 1 gram per decilitre. A water-soluble alcoholic compound, in this case propylene glycol, was then added to this solution, 20% by volume of the solution being added in this case. The resulting solution was dripped through a capillary tube into an aqueous solution of 30% ammonium hydroxide. The microspheres which were obtained were aged in the same solution for a suitable time, in this case 12 hours, and afterwards washed. After drying, the microspheres were calcined in air at 450° C. Then the microspheres were charged in recrystallized alumina cups in a graphite resistance furnace equipped with a reaction pipe of alumina.

The furnace was brought to a temperature of 1600° C. at a rate of thermal increase of 400° C./hour. It was maintained at this temperature for 2.5 hours and then cooled to 1000° C. at a decrease at 400° C./hour, and afterwards freely to room temperature.

Up to a temperature of 1100° C., the operation was carried out in the presence of a stream of commercial argon, but at 1100° C. the stream of argon was replaced by a stream of $H_2$ which was maintained until the end of the thermal cycle. The porosity of the final product was found to be 20.15%.

EXAMPLE 2

This example is concerned with the preparation of microspheres of $UO_2$ having a porosity of about 10%. The procedure of Example 1 was followed except that a change from an argon to an argon-hydrogen (96:4) atmosphere was effected at a temperature of 800° C. The porosity of the final product was found to be 9.75.

EXAMPLE 3

This example is concerned with the preparation of microspheres of $UO_2$ containing 10% $PuO_2$, having a porosity of approximately 20%.

The procedure of Example 1 was followed, except that a suitable amount of plutonium was added to the starting solution. The plutonium was added in the form of a solution of polymeric tetravalent plutonium nitrate which was 2 M in plutonium and which had a molar ratio of $NO_3^-$/Pu of about 3.9.

The porosity of the product was found to be 17.90%.

EXAMPLE 4

This example concerns the preparation of microspheres of $UO_2$ containing 10% $PuO_2$, having a porosity of about 10%.

The procedure of Example 3 was followed except the change from argon to argon-hydrogen 4% was effected at 900° C. The porosity of the product was found to be 8.90%.

What we claim is:

1. Process for the production of a porous refractory material which comprises uranium oxide and an oxide selected from the group consisting of the oxides of thorium, plutonium, beryllium, silicon, aluminum and magnesium, which process comprises heating the selected refractory material in finely divided form at a rate of from 320 to 480 centigrade degrees per hour to a maximum temperature in the range of from 1280 to 1920° C., maintaining the heated material in that range for from 2 to 3 hours, and then cooling the refractory material at a rate of from 320 to 480 centigrade degrees per hour to a temperature in the range of from 960 to 1440, and thence to room temperature at any desired rate, the atmosphere in which the refractory material is situated being inert or oxidizing over the initial part of the heating stage but being made reducing at a temperature between 700° C. and the maximum temperature and maintained reducing for the remainder of the process, so as to produce refractory material having a porosity of from 2%–30%.

2. Process according to claim 1 wherein the uranium oxide has the formula $UO_{3.2-3.3}$ 3. Process according to claim 1 wherein the refractory material is a mixture of uranium oxide and plutonium oxide.

4. Process according to claim 1 wherein the maximum temperature lies in the range from 1440 to 1760° C.

5. Process according to claim 4, wherein the maximum temperature is approximately 1600° C.

6. Process according to claim 1 wherein the heating rate or the cooling rate of the first part of the cooling stage is in the range from 360 to 440 centigrade degrees per hour.

7. Process according to claim 6, wherein the heating rate or the cooling rate of the first part of the process is approximately 400 centigrade degrees per hour.

8. Process according to claim 1 wherein the refractory material is maintained at the maximum temperature for from 2.25 to 2.75 hours.

9. Process according to claim 8, wherein the refractory material is maintained at the maximum temperature for approximately 2.5 hours.

10. Process according to claim 1 wherein the first part of the cooling stage is continued until a temperature in the range of from 1080 to 1320° C. has been reached.

11. Process according to claim 10, wherein the first part of the cooling stage is continued until a temperature of approximately 1200° C. has been reached.

12. Process according to claim 1 wherein the inert atmosphere is nitrogen or argon.

13. Process according to claim 1 wherein the oxidizing atmosphere is oxygen or air.

14. Process according to claim 1 wherein the reducing atmosphere is hydrogen or a mixture of hydrogen and argon.

15. A process for the production of a porous refractory oxide which comprises heating $U_3O_8$ or $UO_{3.2-3.3}$ in finely divided form at a rate of from 320 to 480 centigrade degrees per hour to a maximum temperature in the range of from 1280 to 1920° C., maintaining the heated material in that range from 2 to 3 hours, and then cooling the refractory material at a rate of from 320 to 480 centigrade degrees per hour to a temperature in the range of from 960 to 1440 and thence to room temperature at any desired rate, the atmosphere in which the refractory material is situated being inert or oxidizing over the initial part of the heating stage but being made reducing at a temperature between 700° C. and the maximum temperature and maintained reducing for the remainder of the process, so as to produce refractory material having a porosity of from 2% to 30%.

16. A process for the production of a porous refractory material which comprises uranium oxide and plutonium oxide which comprises heating the selected refractory material in finely divided form at a rate of from 320 to 480 centigrade degrees per hour to a maximum temperature in the range of from 1280 to 1920° C., maintaining the heated material in that range for from 2 to 3 hours, and then cooling the refractory material at a rate of from 320 to 480 centigrade degrees per hour to a temperature in the range of from 960 to 1440 and thence to room temperature at any desired rate, the atmosphere in which the refractory material is situated being inert or oxidizing over the initial part of the heating stage but being made reducing at a temperature between 700° C. and the maximum temperature and maintained reducing for the remainder of the process so as to produce refractory material having a porosity of from 2%–30%.

References Cited
UNITED STATES PATENTS

| | | | |
|---|---|---|---|
| 3,194,852 | 7/1965 | Lloyd et al. | 264—.5 |
| 3,343,926 | 9/1967 | Knudsen et al. | 23—355 |
| 3,258,317 | 6/1966 | Brearton | 23—355 |

OTHER REFERENCES

Hausner: Powder Metallurgy in Nuclear Engineering, ASM, Cleveland, Ohio, 1958, pp. 214–215 (TN/695/A4/c.2).

CARL D. QUARFORTH, Primary Examiner

R. L. TATE, Assistant Examiner

U.S. Cl. X.R.

264—.5